US012676379B2

(12) United States Patent
Zhao et al.

(10) Patent No.: US 12,676,379 B2
(45) Date of Patent: Jul. 7, 2026

(54) BATTERY PACK AND OUTPUT END PROTECTION SUPPORT

(71) Applicant: CALB Co., Ltd., Jiangsu (CN)

(72) Inventors: Dong Zhao, Changzhou (CN);
Fanming Kong, Changzhou (CN);
Ruisheng Tian, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 843 days.

(21) Appl. No.: 17/967,905

(22) Filed: Oct. 18, 2022

(65) Prior Publication Data

US 2023/0378591 A1 Nov. 23, 2023

(30) Foreign Application Priority Data

May 17, 2022 (CN) .......................... 202210534867.X

(51) Int. Cl.
*H01M 50/296* (2021.01)
*H01M 50/204* (2021.01)
*H01M 50/517* (2021.01)

(52) U.S. Cl.
CPC ....... *H01M 50/296* (2021.01); *H01M 50/204* (2021.01); *H01M 50/517* (2021.01)

(58) Field of Classification Search
CPC .................................................. H01M 50/296
See application file for complete search history.

(56) References Cited

U.S. PATENT DOCUMENTS

2018/0337384 A1 11/2018 Volinski et al.
2022/0285755 A1* 9/2022 Chi ..................... H01M 50/507

FOREIGN PATENT DOCUMENTS

| CN | 108963123 | 12/2018 |
| CN | 215342825 | 12/2021 |
| CN | 114041230 | 2/2022 |
| CN | 217306621 | 8/2022 |
| WO | 2021025473 | 2/2021 |
| WO | 2021199070 | 10/2021 |

OTHER PUBLICATIONS

"Search Report of Europe Counterpart Application", issued on Sep. 6, 2023, p. 1-p. 7.
"Office Action of China Counterpart Application", issued on Nov. 1, 2025, p. 1-p. 6.

* cited by examiner

*Primary Examiner* — Maria Laios
*Assistant Examiner* — Jordan E Berresford
(74) *Attorney, Agent, or Firm* — JCIP GLOBAL INC.

(57) ABSTRACT

A battery pack and an output end protection support are provided. The battery pack includes a box body, a first output end protection support, and a second output end protection support. The first output end protection support is arranged on the box body. The second output end protection support is arranged on the box body. The first output end protection support is directly connected to the second output end protection support, and the first output end protection support and the second output end protection support are movably arranged relative to each other.

7 Claims, 4 Drawing Sheets

BATTERY PACK AND OUTPUT END PROTECTION SUPPORT

CROSS-REFERENCE TO RELATED APPLICATION

This application claims the priority benefit of China application serial no. 202210534867.X, filed on May 17, 2022. The entirety of the above-mentioned patent application is hereby incorporated by reference herein and made a part of this specification.

BACKGROUND

Technical Field

The disclosure relates to the technical field of batteries, in particular to a battery pack and an output end protection support.

Description of Related Art

In the related art, the position between the output pole of the battery assembly in the battery pack and the protection support cannot be accurately positioned, resulting in a dimensional deviation in the connection between the output pole and the protection support, and therefore the output pole and the protection support cannot be closely fitted. As a result, the contact resistance is larger, which causes a lot of heat to be generated, and results in safety risks of the battery pack.

SUMMARY

The present disclosure provides a battery pack and an output end protection support.

In a first aspect of the present disclosure, a battery pack is provided. The battery includes A box body, a first output end protection support, and a second output end protection support. The first output end protection support is arranged on the box body. The second output end protection support is arranged on the box body, the first output end protection support is directly connected to the second output end protection support, and the first output end protection support and the second output end protection support are movably arranged relative to each other.

In a second aspect of the present disclosure, there is provided an output end protection support. The output end protection support includes a main body. The main body includes a first surface and a second surface opposite to each other, the first surface and the second surface are respectively provided with a slot and a slide block. The slot and the slide block correspond in shape such that the slot is configured to be able to receive a slide block of another output end protection support, or the slide block of the output end protection support is configured to be able to insert a slot of another output end protection support.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

Figure 1:
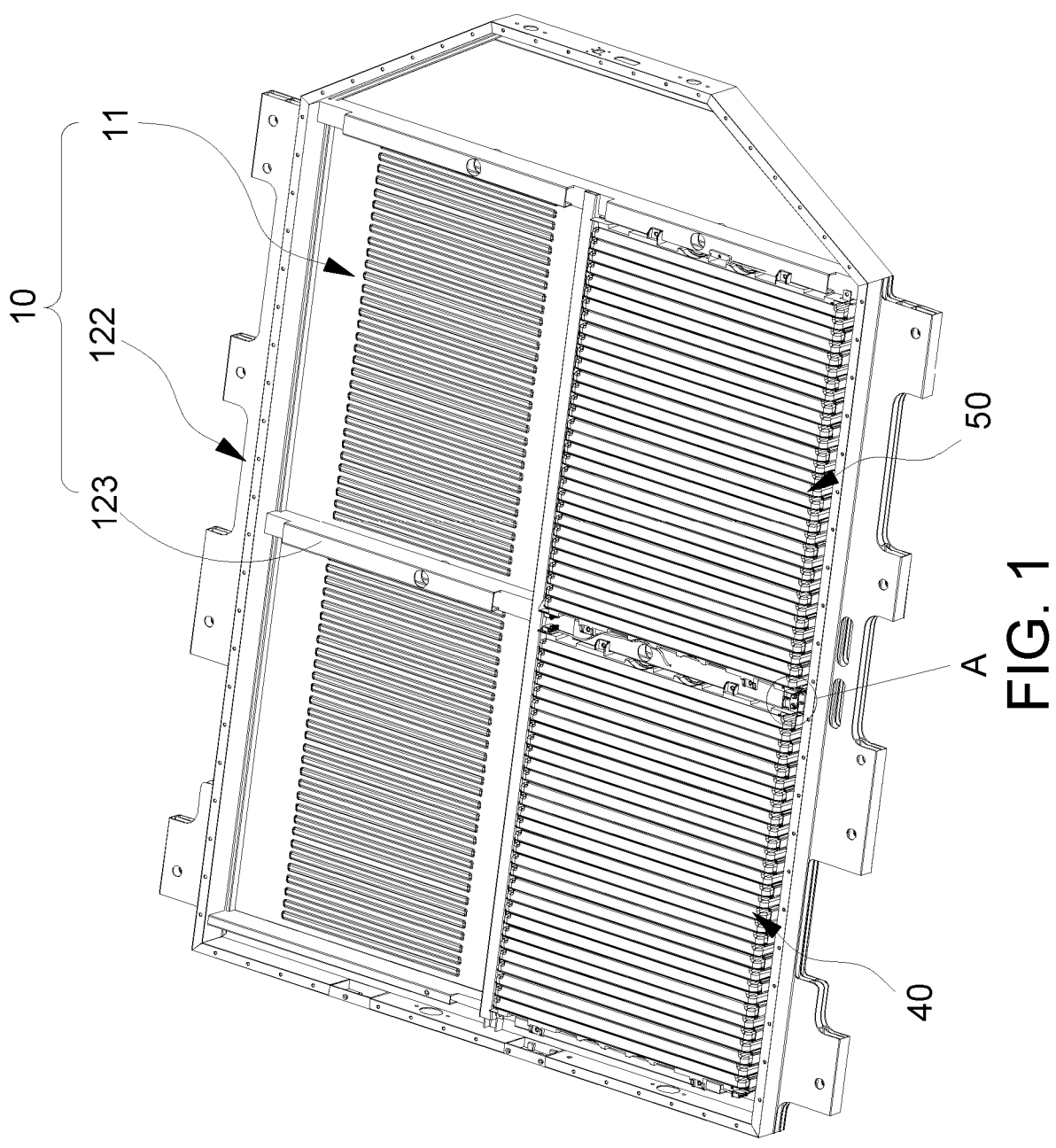
FIG. 1 is a schematic structural view of a battery pack provided by an embodiment of the present disclosure.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

Referring to FIG. 1 to FIG. 6, the present embodiment provides a battery pack, which includes a box body 10, a first output end protection support 20, and a second output end protection support 30. The first output end protection support 20 and the second output end protection support 30 are both disposed on the box body 10. The first output end protection support 20 is directly connected to the second output end protection support 30, and the first output end protection support 20 and the second output end protection support 30 are movably disposed relative to each other.

In the battery pack provided in this embodiment, the first output end protection support and the second output end protection support 30 are arranged in the box body 10, and the first output end protection support 20 and the second output end protection support 30 are directly connected. When it is necessary to connect the output pole of the battery assembly in the battery box to the first output end protection support 20 or the second output end protection support 30, since the first output end protection support 20 and the second output end protection support 30 are movably arranged relative to each other in the connection direction of the first output end protection support 20 and the second output end protection support 30, by moving the first output end protection support 20 or the second output end protection support 30, it is possible to ensure that the output pole of the battery assembly may be accurately connected to the first output end protection support 20 or the second output end protection support 30.

It should be understood that, the first output end protection support 20 and the second output end protection support 30 are arranged in the box body 10 means that the first output end protection support 20 and the second output end protection support 30 may be arranged inside the box body 10, and may also be arranged on the box body 10.

In an embodiment, the box body 10 includes a bottom plate 11 and a main frame, and the main frame is disposed on the bottom plate 11 to form a battery accommodating space. The first output end protection support 20 and the second output end protection support 30 are both disposed on the main frame, and the first output end protection support 20 and the second output end protection support 30 are both movably arranged along the main frame.

Exemplarily, the first output end protection support 20 and the second output end protection support 30 may move relative to each other in a direction parallel to the bottom plate 11.

The first output end protection support 20 and the second output end protection support are movably arranged relative to each other in a set direction on a plane parallel to the bottom plate 11, and the set direction is perpendicular to the arrangement direction of the first output end protection support 20 and the second output end protection support 30.

Figure 3:
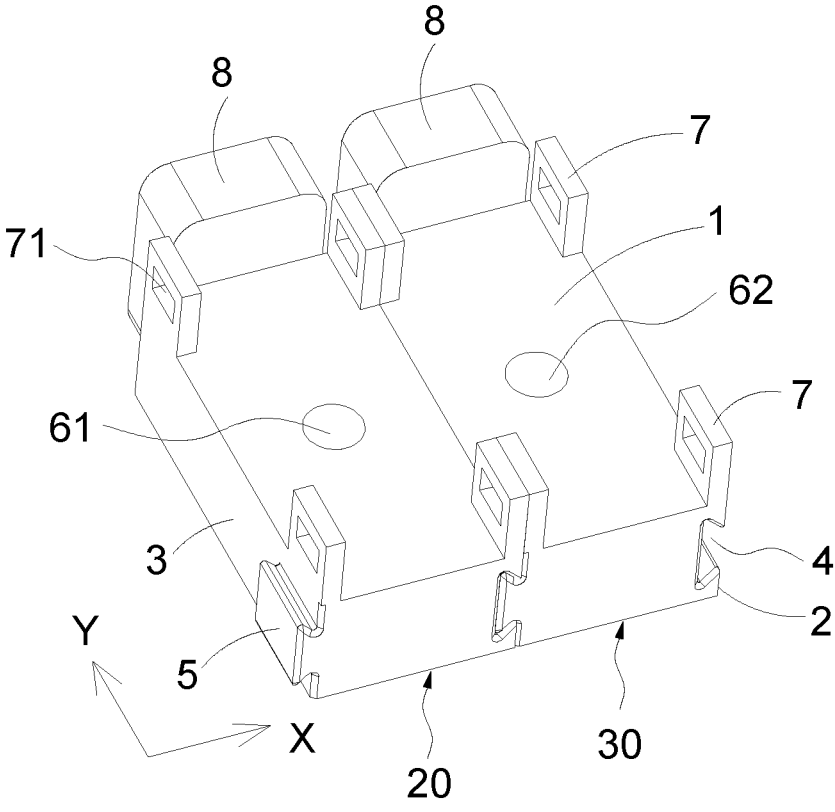
FIG. 3 is a schematic structural view of the cooperation of the first output end protection support and the second protection support in an embodiment of the present disclosure.

Referring to FIG. 3, the first output end protection support 20 and the second output end protection support 30 are arranged in the arrow direction X, and the set direction is parallel to the arrow direction Y in FIG. 3. The first output end protection support 20 and the second output end protection support 30 are movably disposed relative to each other in the arrow direction Y on a plane parallel to the bottom plate 11. Specifically, the first output end protection support 20 may move in the arrow direction Y relative to the second output end protection support 30, and the second output end protection support 30 may also move in the arrow direction Y relative to the first output end protection support 20.

It should be noted that the first output end protection support 20 and the second output end protection support 30 may also be arranged movably relative to each other in the direction perpendicular to the bottom plate 11. In this way, it is possible to adapt to two output poles that have positions at different heights, that is, when the output poles of the two battery assemblies are not in the same plane, the position of the first output end protection support 20 or the position of the second output end protection support 30 may be adjusted in the direction perpendicular to the bottom plate 11 to be accurately docked with the two output poles.

In an embodiment, as shown in FIG. 1, the battery pack further includes a first battery assembly 40 and a second battery assembly 50. The first battery assembly 40 includes a first output pole 41, and the first output pole 41 is connected to the first output end protection support 20. The second battery assembly 50 includes a second output pole 51, and the second output pole 51 is connected to the second output end protection support 30.

The first battery assembly 40 and the second battery assembly 50 are located in the battery accommodating space, the first output pole 41 and the second output pole 51 are close to each other, and the first output end protection support 20 and the second output end protection support 30 are located between the first battery assembly 40 and the second battery assembly 50. The first output pole 41 is connected to the first output end protection support 20, and the second output pole 51 is connected to the second output end protection support 30.

Exemplarily, the position of the first output end protection support 20 and the position of the second output end protection support 30 may be adjusted respectively to ensure accurate connection between the first output pole 41 and the first output end protection support 20, and to ensure accurate connection between the second output pole 51 and the second output end protection support 30.

For example, during the assembly process, the first output pole 41 and the first output end protection support 20 have been accurately connected. Under the circumstances, only the position of the second output pole 51 needs to be adjusted to ensure the accurate connection between the second output pole 51 and the second output end protection support 30. The position of the first output end protection support 20 will not be affected, which improves the assembly efficiency.

In an embodiment, as shown in FIG. 1, the main frame includes a frame 122 and a partition beam 123, and the frame 122 is arranged around the bottom plate 11 to form a battery accommodating space. The partition beam 123 is arranged in the frame 122 to separate the battery accommodating space. The first battery assembly 40 and the second battery assembly 50 are respectively located on both sides of the partition beam 123, and there is a space between the partition beam 123 and the top plate (not shown in the figure) of the box body 10. The first output end protection support 20 and the second output end protection support 30 are both arranged on the partition beam 123, that is, the first output end protection support 20 and the second output end protection support 30 are both arranged in the space between the partition beam 123 and the top plate. the above configuration may not only improve the utilization rate of the internal space of the battery pack, but also facilitate the connection of the first output pole 41 to the first output end protection support 20 and the connection of the second output pole 51 to the second output end protection support 30.

In an embodiment, the first output end protection support 20 and the second output end protection support 30 are arranged in sequence in the width direction of the partition beam 123.

Specifically, the width direction of the partition beam 123 refers to the direction from one side of the partition beam 123 close to the first battery assembly 40 to one side of the partition beam 123 close to the second battery assembly 50. The width direction of the partition beam 123 is parallel to the arrow direction X. The first output end protection support 20 and the second output end protection support 30 are arranged in sequence in the width direction of the partition beam 123. Such configuration may ensure that the first output pole 41 is close to the first output end protection support 20, and the second output end protection support 30 is close to the second output pole 51 to facilitate assembly.

In an embodiment, the first output end protection support 20 and the second output end protection support 30 are both disposed at the top end of the main frame and are movably disposed along the top end of the main frame.

Figure 2:
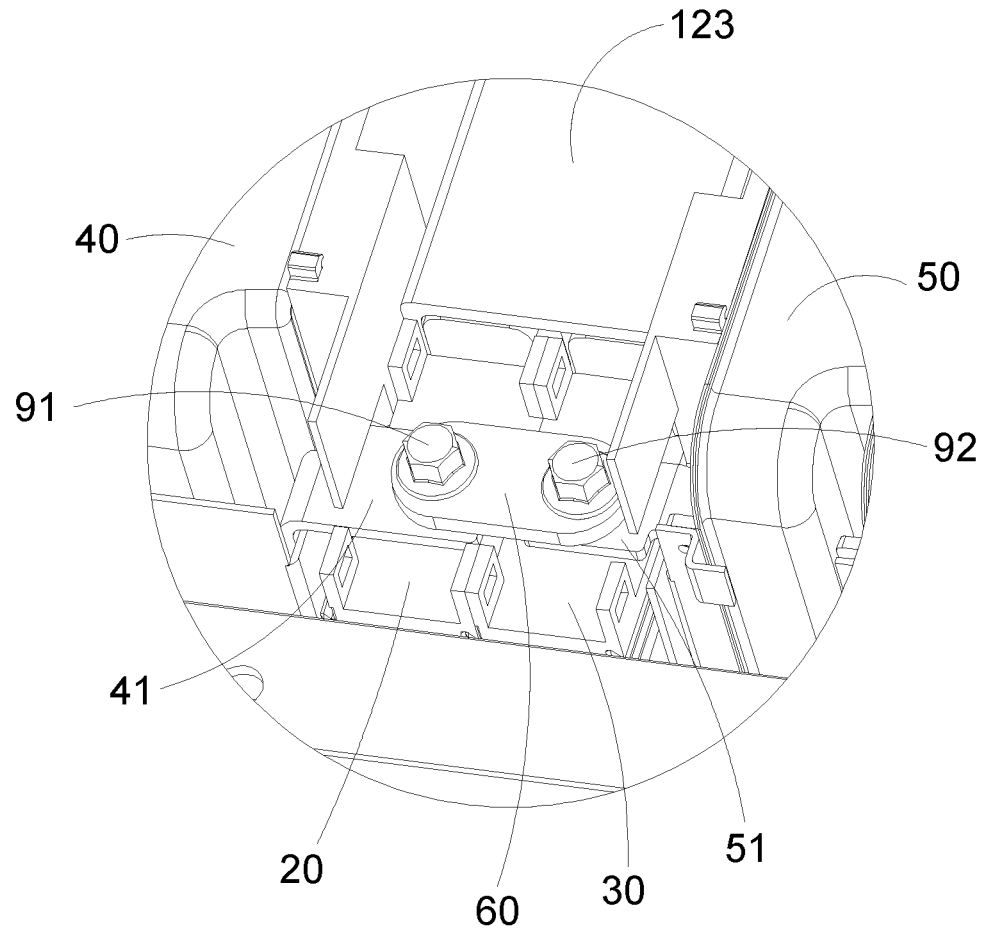
FIG. 2 is a partial enlarged view of position A in FIG. 1.

Specifically, as shown in FIG. 2, the first output end protection support 20 and the second output end protection support 30 are both disposed on the upper surface of the partition beam 123, and the first output end protection support 20 and the second output end protection support 30 are movably arranged along the upper surface of the partition beam 123.

Exemplarily, the upper surface of the partition beam 123 is parallel to the bottom plate 11, and the first output end protection support 20 and the second output end protection support 30 may move relative to each other in the direction parallel to the bottom plate 11 on the upper surface of the partition beam 123.

It should be noted that the battery pack may further include an end plate, the end plate is configured to fix the battery assembly, and the first output end protection support 20 and the second output end protection support 30 may further be movably disposed relative to each other on the end plate.

In an embodiment, as shown in FIG. 2, the battery pack further includes a conductive member 60, and the conductive member 60 is connected to the first output pole 41 and the second output pole 51.

In some embodiments, the conductive member 60 may be a copper bar to realize serial or parallel connection of the first battery assembly 40 and the second battery assembly 50.

In an embodiment, as shown in FIG. 2 and FIG. 3, the first output end protection support is provided with a first connection portion 61, and the second output end protection support 30 is provided with a second connection portion 62. The battery pack further includes a first fastener 91 and a second fastener 92. The first fastener 91 passes through the conductive member 60 and the first output pole 41, and is connected to the first connection portion 61. The second fastener 92 passes through the conductive member 60 and the second output pole 51, and is connected to the second connection portion 62.

In some embodiments, the conductive member 60 is provided with a first mounting hole and a second mounting hole. The first output pole 41 and the second output pole 51 are both provided with a through hole. The first fastener 91 passes through the first mounting hole and the through hole on the first output pole 41, and is connected to the first connection portion 61. The second fastener 92 passes through the second mounting hole and the through hole on the second output pole 51, and is connected to the second connection portion 62.

In an embodiment, the first connection portion 61 is a first threaded hole, the second connection portion 62 is a second threaded hole, the first fastener 91 is a first bolt, and the second fastener 92 is a second bolt.

By connecting the first bolt to the first threaded hole, the conductive member 60 and the first output pole 41 are pressed and fixed on the first output end protection support 20. By connecting the second bolt to the second threaded hole, the conductive member 60 and the second output pole 51 are pressed and fixed on the second output end protection support 30.

In some embodiments, the first connection portion 61 may also be a nut provided on the first output end protection support 20. The second connection portion 62 may also be a nut provided on the second output end protection support 30.

In an embodiment, the first output end protection support 20 is slidably connected to the second output end protection support 30. Exemplarily, the first output end protection support 20 and the second output end protection support 30 may slide relative to each other in the length direction of the partition beam 123.

In an embodiment, the first output end protection support 20 is provided with a slot 4, the second output end protection support 30 is provided with a slide block 5, and the first output end protection support 20 and the second output end protection support 30 are connected through the slot 4 and the slide block 5.

In an embodiment, the first output end protection support 20 and the second output end protection support 30 have the same structure. Specifically, both the first output end protection support 20 and the second output end protection support 30 include a main body 1, and the main body 1 includes a first surface 2 and a second surface 3 opposite to each other. The first surface 2 of the first output end protection support 20 and the first surface 2 of the second output end protection support 30 are both provided with the slot 4. The second surface 3 of the first output end protection support 20 and the second surface 3 of the second output end protection support 30 are both provided with the slide block 5. The slot 4 of the first output end protection support 20 may be engaged with the slide block 5 of the second output end protection support 30, and the slide block 5 of the first output end protection support 20 may also be engaged with the slot 4 of the second output end protection support 30.

Exemplarily, the main body 1 of the first output end protection support 20 and the main body 1 of the second output end protection support 30 are substantially rectangular block structures.

Exemplarily, as shown in FIG. 3, the slot 4 is a dovetail slot, and the slide block 5 is a trapezoidal slide block corresponding to the dovetail slot. Such configuration may improve the connection strength of two adjacent output end protection supports and prevent the two output end protection supports from being separated.

Figure 4:
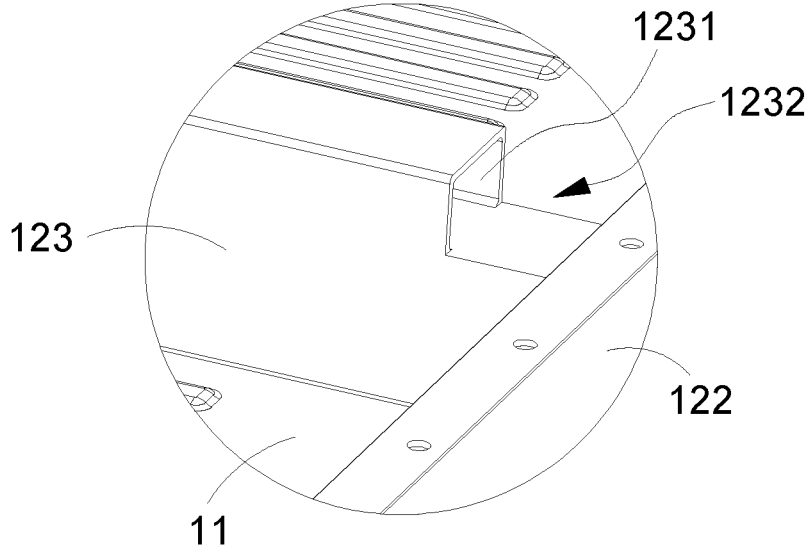
FIG. 4 is a partial schematic view of a battery pack provided by an embodiment of the present disclosure.

In an embodiment, as shown in FIG. 4, the partition beam 123 is formed with a cavity 1231, one end of the first output end protection support 20 is inserted into the cavity 1231, and one end of the second output end protection support 30 is inserted into the cavity 1231, such that the first output end protection support 20 and the second output end protection support 30 are limited to move in the direction perpendicular to the top end of the partition beam 123.

Specifically, the partition beam 123 is a profile with a cavity 1231, an end portion of the partition beam 123 has an opening, and the opening communicates with the cavity 1231. One end of the first output end protection support 20 is inserted into the cavity 1231 from the opening, and one end of the second output end protection support 30 is inserted into the cavity 1231 from the opening. The outer contour of the part of the first output end protection support 20 inserted into the cavity 1231 and the outer contour of the part of the second output end protection support inserted into the cavity 1231 correspond in shape with the cavity 1231, such that the first output end protection support 20 and the second output end protection support 30 are limited to move in a direction perpendicular to the upper surface of the partition beam 123.

In an embodiment, one end of the main body 1 is provided with a fixing portion 8, and the fixing portion 8 may be inserted into the cavity 1231.

Exemplarily, the fixing portion 8 is integrally formed with the main body 1, and the fixing portion 8 has a hollow columnar structure. In order to improve the structural strength of the fixing portion 8, a reinforcing rib 81 is provided in the fixing portion 8.

Figure 6:
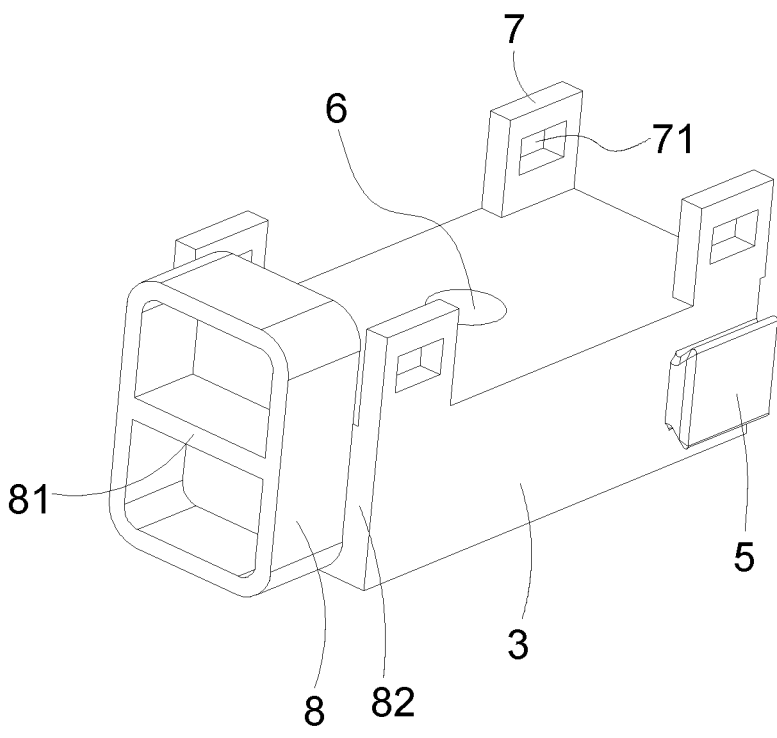
FIG. 6 is a schematic structural view of an output end protection support provided by an embodiment of the present disclosure.

During configuration, the fixing portion 8 may be inserted into the cavity 1231 inside the partition beam 123. Referring to FIG. 6, the main body 1 has a position-limiting surface 82, and the position-limiting surface 82 may abut against the end surface of the partition beam 123 to prevent the main body 1 from being entirely pushed into the cavity 1231. The length direction of the fixing portion 8 is consistent with the length direction of the slot 4, that is, the insertion direction of the fixing portion 8 inserted into the cavity 1231 is consistent with the length direction of the slot 4. The length of the fixing portion 8 is configured to satisfy the sliding adjustment range of the main body 1 along the slot 4. That is, when the main body 1 moves away from the insertion direction to adjust the alignment of the threaded hole on the main body 1 with the through hole of the first output pole 41 and the through hole of the second output pole 51, the fixing portion 8 is never removed from the cavity 1231.

In an embodiment, the partition beam 123 is provided with a recessed portion 1232, and both the first output end protection support 20 and the second output end protection support 30 are located in the recessed portion 1232.

Exemplarily, referring to FIG. 4, the recessed portion 1232 is located on the upper surface of the partition beam 123, and the recessed portion 1232 is close to the end portion of the partition beam 123. The recessed portion 1232 has a bottom surface and a lateral surface, the bottom surface is parallel to the bottom plate 11, and the opening is provided on the lateral surface. Both the first output end protection support 20 and the second output end protection support 30 are located on the bottom surface of the recessed portion 1232, and the fixing portion 8 is inserted into the cavity 1231 from the opening on the lateral surface of the recessed portion 1232.

In an embodiment, the main body 1 is provided with engaging portions 7, the engaging portions 7 are provided in pairs, and the paired engaging portions 7 are respectively close to the first surface 2 and the second surface 3.

Exemplarily, the main body 1 is provided with four engaging portions 7, among which, two engaging portions 7 are arranged at intervals on one side of the main body 1 close to the first surface, and the other two engaging portions 7 are arranged at intervals on another side of the main body 1 close to the second surface. The two engaging portions 7 on the same side are located on both sides of the output pole of the battery pack. An engaging opening 71 is provided on each of the four engaging portions 7.

In an embodiment, the battery pack further includes a protection cover 70, the protection cover 70 is disposed at the top end of the first output end protection support 20 and the second output end protection support 30, and the protection cover 70 is engaged with the first output end protection support 20. The protection cover 70 is engaged with the second output end protection support 30. By disposing the protection cover 70, at least a part of the conductive member and the output pole of the battery assembly may be covered, so as to serve the insulation and protection functions, and improve the safety of the battery pack.

In some embodiments, the protection cover 70 is provided with hooks 702, and the hooks 702 are respectively limited to the engaging openings 71.

Exemplarily, the protection cover 70 includes a top plate 701 and side walls surrounding the top plate 701. The hooks 702 are provided on the side walls. Specifically, two opposite side walls are respectively provided with two hooks 702. Both ends of the two opposite side walls are respectively provided with avoidance spaces, and the hooks 702 are respectively located in the avoidance spaces. Each of the four engaging portions 7 of the main body 1 is provided with an engaging opening 71. The protection cover 70 is fastened on the main body 1, and the four engaging portions 7 respectively correspond to the four avoidance spaces, and the hooks 702 are respectively limited to the engaging openings 71.

In an embodiment, the upper surface of the protection cover 70 is provided with a groove 703 for accommodating the low-voltage collection harness.

Figure 5:
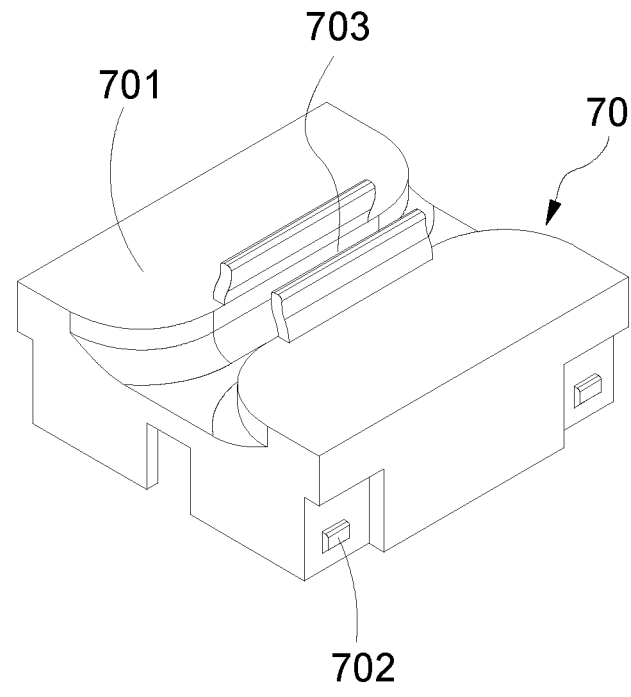
FIG. 5 is a schematic structural view of a protection cover in an embodiment of the present disclosure.

In some embodiments, the groove 703 is used to accommodate the low-voltage collection harness. Referring to FIG. 5, the groove 703 is provided on the top plate 701, and the width of the bottom portion of the groove 703 is greater than the width of the groove opening to ensure interference fit between the low-voltage collection harness and the groove 703, and prevent the low-voltage collection harness from detaching from the groove 703. Exemplarily, the width of the groove 703 gradually decreases in a direction from the bottom portion of the groove 703 to the groove opening.

Referring to FIG. 6, this embodiment further provides an output end protection support, which includes a main body 1, and the main body 1 includes a first surface 2 and a second surface 3 opposite to each other. The first surface 2 and the second surface 3 are respectively provided with the slot 4 and the slide block 5, and the slot 4 corresponds in shape with the slide block 5, so that the slot 4 may be used to accommodate a slide block of another output end protection support, or the slide block 5 of the output end protection support may be used to insert a slot of another output end protection support.

For the output end protection support provided in this embodiment, by disposing the slot 4 and the slide block 5 respectively on the opposite first surface 2 and the second surface 3 of the main body 1, it is easy to perform movable assembly of two output end protection supports. That is, the slot 4 of one of the output end protection supports may accommodate the slide block 5 of another output end protection support, or the slide block 5 of one of the output end protection supports may be used to insert into the slot 4 of another output end protection support. Further, by moving the output end protection support, it is possible to ensure that the output pole of the battery module may be accurately connected to the output end protection support.

In an embodiment, the main body 1 is provided with a connection portion 6 for connecting to a fastener.

In some embodiments, the connection portion 6 is a threaded hole provided inside the main body 1, and may also be a nut embedded in the main body 1.

In an embodiment, the main body 1 is provided with engaging portions 7, the engaging portions 7 are provided in pairs, and the paired engaging portions 7 are respectively close to the first surface 2 and the second surface 3.

In an embodiment, the main body 1 is provided with a fixing portion 8, and the fixing portion 8 is configured to be connected to a cavity of the box body 10 of the battery pack.

Exemplarily, the cavity of the box body 10 may be the cavity 1231 of the partition beam 123.

It should be noted that, the structure of the output end protection support provided in this embodiment is the same as the structure of the first output end protection support 20, and details are not repeated here.

Through the connection along with slidable adjustment of the two output end protection supports provided in this embodiment, it is possible to ensure that the output pole of the battery assembly is accurately connected to the output end protection support.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery pack, comprising:
a box body;
a first output end protection support, wherein the first output end protection support is arranged on the box body;
a second output end protection support, wherein the second output end protection support is arranged on the box body, the first output end protection support is slidably connected to the second output end protection support and directly contacts the second output end protection support, and the first output end protection support and the second output end protection support are movably arranged relative to each other;
a first battery assembly, wherein the first battery assembly comprises a first output pole, and the first output pole is connected to the first output end protection support;
a second battery assembly, wherein the second battery assembly comprises a second output pole, and the second output pole is connected to the second output end protection support; and
a conductive member, wherein the conductive member is connected to the first output pole and the second output pole,
wherein the first output end protection support is provided with a slot, the second output end protection support is provided with a slide block, and the first output end protection support and the second output end protection support are connected through the slot and the slide block.

2. The battery pack according to claim 1, wherein the first output end protection support is provided with a first connection portion, and the second output end protection support is provided with a second connection portion, and the battery pack further comprising:
a first fastener, wherein the first fastener passes through the conductive member and the first output pole, and is connected to the first connection portion; and
a second fastener, wherein the second fastener passes through the conductive member and the second output pole, and is connected to the second connection portion.

3. The battery pack according to claim 2, wherein the first connection portion is a first threaded hole, the second connection portion is a second threaded hole, the first fastener is a first bolt, and the second fastener is a second bolt.

4. The battery pack according to claim 1, wherein the first output end protection support and the second output end protection support are movably arranged relative to each other in a set direction on a plane parallel to a bottom plate of the box body, and the set direction is perpendicular to an arrangement direction of the first output end protection support and the second output end protection support.

5. The battery pack according to claim 1, wherein the box body comprises:
a bottom plate; and
a main frame, wherein the main frame is disposed on the bottom plate to form a battery accommodating space;
wherein the first output end protection support and the second output end protection support are adjacent to the main frame, and the first output end protection support and the second output end protection support are both movably arranged along the main frame.

6. The battery pack according to claim 5, wherein the main frame comprises:
a frame, wherein the frame is arranged around the bottom plate to form the battery accommodating space; and
a partition beam, wherein the partition beam is arranged in the frame to separate the battery accommodating space;
wherein the partition beam is formed with a cavity, one end of the first output end protection support is inserted into the cavity, and one end of the second output end protection support is inserted into the cavity, such that the first output end protection support and the second output end protection support are limited to move in a direction perpendicular to an upper surface of the partition beam.

7. The battery pack according to claim 6, wherein the partition beam is provided with a recessed portion, and both the first output end protection support and the second output end protection support are located in the recessed portion.

* * * * *